(12) United States Patent
Huang

(10) Patent No.: US 8,904,330 B2
(45) Date of Patent: Dec. 2, 2014

(54) PHASE DETERMINATION FOR EXTRACTION FROM SCATTERING PARAMETERS

(71) Applicant: Synopsys, Inc., Mountain View, CA (US)

(72) Inventor: Jinghua Huang, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/832,460

(22) Filed: Mar. 15, 2013

(65) Prior Publication Data

US 2014/0282335 A1 Sep. 18, 2014

(51) Int. Cl.
*G06F 17/50* (2006.01)

(52) U.S. Cl.
CPC ................. *G06F 17/5068* (2013.01)
USPC ........................................ 716/113

(58) Field of Classification Search
CPC ................. G06F 17/30; G06F 17/50
USPC ........................................ 716/113
See application file for complete search history.

(56) References Cited

U.S. PATENT DOCUMENTS

| | | | |
|---|---|---|---|
| 7,676,351 B2 | 3/2010 | Jandhyala et al. | |
| 7,814,445 B2 | 10/2010 | Iwaki et al. | |
| 8,063,713 B2 | 11/2011 | Cheng et al. | |
| 8,386,216 B1 * | 2/2013 | Al-Hawari et al. | 703/2 |
| 2008/0015829 A1 * | 1/2008 | Jandhyala et al. | 703/2 |
| 2010/0085132 A1 * | 4/2010 | Cheng et al. | 333/245 |
| 2011/0241799 A1 * | 10/2011 | Wang et al. | 333/181 |

FOREIGN PATENT DOCUMENTS

| | | |
|---|---|---|
| CN | 102054071 A | 5/2011 |
| CN | 102054072 A | 5/2011 |

OTHER PUBLICATIONS

Frequency-Dependent RLGC Extraction for a Pair of Coupled Transmission Lines Using Measured Four-Port S-Parameters, by Han et al., ARTFG Conference Digest Spring, 2004. 63rd. IEEE, 2004, pp. 211-219.
Extraction of Causal RLGC Models from Measurements for Signal Link Path Analysis, Zhang et al., ISSN 978-1-4244-2737-6 © 2008 IEEE.
Accurate Resistance, Inductance, Capacitance, and Conductance (RLGC) From Uniform Transmission Line Measurements, by Degerstrom et al., ISSN 978-1-4244-2873-1/ © 2008 IEEE, pp. 77-80.
S-Parameters, Signal Flow Graphs, and Other Matrix Representations, by M. L. Edwards, From the book: Microwave & RF Circuits: Analysis, Design, Fabrication, & Measurement, 2001, pp. 3.1-3.37.
S-parameters Based Transmission Line Modeling with Accurate Low-Frequency Response, by Kim et al., 2006 IEEE Electrical Performance of Electronic Packaging, 1-4244-0668-4 © 2006 IEEE.

* cited by examiner

*Primary Examiner* — Vuthe Siek
*Assistant Examiner* — Mohammed Alam
(74) *Attorney, Agent, or Firm* — Adams Intellex, PLC

(57) ABSTRACT

Scattering (S) parameters can be evaluated for a plurality of conductors on a semiconductor device to determine phase based on traversal around a Smith chart type representation. A propagation function for the plurality of conductors can be derived from S parameters, which in turn, can be used to derive resistance, inductance, capacitance, and/or conductance parameters. A Smith chart representation is used to obtain zero crossing information for determination of accurate phase information.

29 Claims, 6 Drawing Sheets

$$S(\omega) \Rightarrow \begin{cases} Z_c(\omega) \\ W(\omega) = e^{-\gamma(\omega)} \\ W(\omega) = e^{-(\alpha(\omega)l + j(2n\pi + \varphi)} \end{cases}$$

$$\gamma(\omega) = \alpha(\omega)l + j(2n\pi + \varphi)$$

$$R(\omega) = \mathrm{Re}(Z_c(\omega) \bullet \gamma(\omega))$$

$$L(\omega) = \frac{1}{\omega}\mathrm{Im}(Z_c(\omega) \bullet \gamma(\omega))$$

$$G(\omega) = \mathrm{Re}(\gamma(\omega) \bullet Z_c^{-1}(\omega))$$

$$C(\omega) = \frac{1}{\omega}\mathrm{Im}(\gamma(\omega) \bullet Z_c^{-1}(\omega))$$

Where $Z_c(\omega)$ is characteristic impedance
$W(\omega)$ is propagation function
$\gamma(\omega)$ is propagation constant

*FIG. 4*

$$500 \longrightarrow \begin{pmatrix} a_{in1} \\ a_{in2} \\ \vdots \\ a_{inM} \\ a_{out1} \\ a_{out2} \\ \vdots \\ a_{outM} \end{pmatrix} = \begin{pmatrix} S_{in1,in1} & \cdots & S_{in1,in2} & \cdots & S_{inM,inM} & \cdots & S_{in1,out1} & \cdots & S_{in1,out2} & \cdots & S_{in1,outM} \\ \vdots & \ddots & \vdots & \ddots & \vdots & \ddots & \vdots & \ddots & \vdots & \ddots & \vdots \\ S_{out1,in1} & \cdots & S_{out2,in1} & \cdots & S_{inM,inM} & \cdots & S_{out1,out1} & \cdots & S_{out2,out2} & \cdots & S_{inM,outM} \\ S_{outM,in1} & \cdots & & \cdots & & \cdots & S_{outM,out1} & \cdots & & \cdots & S_{outM,outM} \end{pmatrix} \begin{pmatrix} b_{in1} \\ b_{in2} \\ \vdots \\ b_{inM} \\ b_{out1} \\ b_{out2} \\ \vdots \\ b_{outM} \end{pmatrix}$$

$$502 \longrightarrow \begin{pmatrix} a_{in1} \\ a_{in2} \\ \vdots \\ a_{inM} \\ a_{out1} \\ a_{out2} \\ \vdots \\ a_{outM} \end{pmatrix} = \begin{pmatrix} S_{in1,in1} & S_{in1,in2} & \cdots & 0 & 0 & 0 & \cdots & S_{in1,outM} \\ S_{in2,in1} & S_{in2,in2} & \cdots & 0 & 0 & 0 & \cdots & 0 \\ \vdots & \vdots & \ddots & \vdots & \vdots & \vdots & \ddots & \vdots \\ 0 & 0 & \cdots & S_{inM,inM} & 0 & 0 & \cdots & 0 \\ S_{out1,in1} & 0 & \cdots & 0 & S_{out1,out1} & S_{out1,out2} & \cdots & 0 \\ S_{out2,in1} & S_{out2,in2} & \cdots & 0 & S_{out2,out1} & S_{out2,out2} & \cdots & 0 \\ \vdots & \vdots & \ddots & \vdots & \vdots & \vdots & \ddots & \vdots \\ 0 & 0 & \cdots & S_{outM,inM} & 0 & 0 & \cdots & S_{outM,outM} \end{pmatrix} \begin{pmatrix} b_{in1} \\ b_{in2} \\ \vdots \\ b_{inM} \\ b_{out1} \\ b_{out2} \\ \vdots \\ b_{outM} \end{pmatrix}$$

*FIG. 5*

PHASE DETERMINATION FOR EXTRACTION FROM SCATTERING PARAMETERS

FIELD OF ART

This application relates generally to transmission lines and more particularly to phase determination for extraction from scattering parameters.

BACKGROUND

State-of-the-art semiconductor circuits are complicated devices which are constructed using exceedingly complex, multi-step processes including handling, photolithographic printing, and chemical processing. The photolithographic printing and chemical processing steps permit the creation of many types of structures required by semiconductor circuits, including diffusion areas for active devices (transistors), polysilicon for transistor gates and interconnect, and various types of metal—including copper—for interconnect. The number of handling, printing, and processing steps may easily run to the thousands. Design feature sizes of the components making up the circuits are routinely smaller than the wavelength of visible light. The number of active devices in a circuit (transistors) may easily run to the tens or hundreds of millions. In addition, rapidly changing market demands and needs drive manufactures to produce circuits with ever-increasing device counts and performance, chip feature sets, system flexibility and versatility, and a variety of other system demands. Often, these disparate demands are mutually exclusive, forcing manufacturers to choose one feature at the expense of others. In addition, the high cost of manufacturing circuits means designers must verify their circuit designs before chips are actually built. To ensure that the chips being built are indeed correct, the design verification process must be extensive and meticulous. After a circuit design is tested, the results are compared to a design specification to ensure that the design can meet the many, and at times, divergent requirements imposed on the design. Ensuring that a design matches its specification becomes more complex with increased circuit operating frequency; as circuit operating frequency increases, wires look like transmission lines and circuit performance changes due to frequency dependent effects. In addition to frequency dependencies, traditional requirements (such as timing, power, and heat, to name only a few) must also be considered. The designer must show, using careful testing protocols, that the circuit meets each of the design requirements, or else the circuit will not function as designed.

Designers have known for years that testing a circuit design must take into account the many physical characteristics of the circuit being tested—the device under test (DUT). These physical characteristics include the sizes of the devices, operating temperature, the parasitic circuit elements associated with the interconnect (i.e. wires), and the pattern and proximity of the interconnect, to name a few. The parasitic circuit elements include resistance (R) and capacitance (C), whether the interconnect material is diffusion, polysilicon, or metal. These Rs and Cs, as they are known, significantly impact the ability of a circuit to perform its intended task. The parasitic Rs and Cs limit the maximum and minimum speeds of a circuit, as well as affecting the ability of a circuit to perform its intended function at all. For circuits operating at sufficiently high clock rates, the metal interconnect of the chip can become an even more significant design problem because of the introduction of a third parasitic element type, inductance (L). The introduction of inductance (L) complicates effort to model a design's interconnect since the designer must take into account three parasitic effects. The long lines of semiconductor chips and printed circuit boards can begin to look less like a conventional wire and more like a transmission line in high frequency design. When the frequency gets higher still, losses must be introduced into the transmission-line model due to yet an additional factor, conductance (G). It is imperative that circuit testing accurately and efficiently model interconnect in a cost-effective manner.

SUMMARY

To investigate a signal distortion caused by a certain arrangement of interconnects, a simulation model which describes electrical properties of an interconnect arrangement, such as attenuation and phase shift, can be created. From S (scattering) parameters, a so called RLGC (resistance, inductance, conductance, and capacitance) model can be created. A propagation function is derived from the S parameters and then used to derive RLGC parameters. However, prior art methods introduce inaccuracies in the propagation function by failing to adequately account for phase. This, in turn, results in inaccuracies of the RLGC parameters. Embodiments disclosed herein utilize zero-crossing information in a Smith-chart representation to achieve improved accuracy in extracting a propagation function for a plurality of interconnects (conductors) based on the S parameters. A computer-implemented method for design analysis is disclosed comprising: obtaining a design with a plurality of conductors; determining scattering (S) parameters for the plurality of conductors; extracting a propagation function for the plurality of conductors based on the S parameters; and calculating phase information for the extracting of the propagation function.

The method may further comprise calculating one or more of resistance, inductance, capacitance, or conductance based on the propagation function. The resistance, inductance, capacitance, or conductance may be determined on a per unit length basis. The phase information may be used in the calculating of the one or more of resistance, inductance, capacitance, or conductance. The determining S parameters may include determining on-diagonal S parameters. The determining S parameters may include determining off-diagonal S parameters. The phase information may be calculated for each of the S parameters of interest. The S parameters may describe a propagation delay for one of the plurality of conductors. The plurality of conductors may comprise transmission lines. The calculating phase information may comprise counting a number of times that one S parameter crosses a $-2\pi$ or 0 boundary. The one S parameter may be an off-diagonal S parameter. The calculating phase information may be accomplished using a Smith chart representation. A trace for the one S parameter may traverse the Smith chart representation in a clockwise direction. The phase may be represented in a form of $2n\pi+\phi$. The letter n may represent the number of times that the one S parameter crosses a $-2\pi$ or 0 boundary. The S parameters may form a 2M-by-2M matrix, where M is a number of conductors for the plurality of conductors; wherein phase for the one of the S parameters continuously decreases as a value for frequency increases; and wherein resistance, inductance, capacitance, or conductance is calculated based on the propagation function. The calculating phase information may be accomplished without using two sets of S parameters extracted from two transmission line systems. The determining the S parameters may be accomplished using a three-dimensional electromagnetic field solver. The determining the S parameters may be accomplished using lumped port excitations.

In embodiments, a computer-implemented method for design analysis may comprise: obtaining a semiconductor design with a plurality of conductors; determining scattering (S) parameters, for the plurality of conductors, to describe electrical operation for the semiconductor design; extracting a propagation function for the plurality of conductors based on the S parameters to describe signal propagation along the plurality of conductors; calculating phase information for the extracting of the propagation function; and calculating one or more of resistance, inductance, capacitance, or conductance based on the propagation function and the phase information. In some embodiments, a computer system for design analysis may comprise: a memory which stores instructions; one or more processors coupled to the memory wherein the one or more processors are configured to: obtain a design with a plurality of conductors; determine scattering (S) parameters for the plurality of conductors; extract a propagation function for the plurality of conductors based on the S parameters; and calculate phase information for the extracting of the propagation function. In embodiments, a computer program product embodied in a non-transitory computer readable medium for design analysis may comprise: code for obtaining a design with a plurality of conductors; code for determining scattering (S) parameters for the plurality of conductors; code for extracting a propagation function for the plurality of conductors based on the S parameters; and code for calculating phase information for the extracting of the propagation function.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4 shows relevant equations for conductors.

FIG. 5 shows example S parameter matrices.

DETAILED DESCRIPTION

A propagation function is derived from S parameters and, in turn, used to derive RLGC parameters. Any inaccuracies in computing the propagation function result in erroneous RLGC parameters. Hence, any results from a time-domain simulator using the erroneous RLGC parameters will also contain inaccuracies. Embodiments disclosed herein utilize zero-crossing information in a Smith chart representation to achieve improved accuracy in extracting a propagation function for a plurality of interconnects (conductors) based on the S parameters. Taking into consideration the number of zero crossings reduces the error in computing the propagation function, which can provide improved results from time domain simulators (such as SPICE) that utilize the extracted RLGC parameters.

A propagation function is derived from S parameters, which is, in turn, used to derive RLGC parameters. Any inaccuracies in computing the propagation function results in erroneous RLGC parameters. Hence, any results from a time domain simulator using the erroneous RLGC parameters will also contain inaccuracies. Embodiments disclosed herein utilize zero crossing information in a Smith chart representation to achieve improved accuracy in extracting a propagation function for a plurality of interconnects (conductors) based on the S parameters. Considering the number of zero crossings reduces the error often found in computing the propagation function, which can provide improved results from time domain simulators (such as SPICE) that utilize the extracted RLGC parameters.

Figure 1:
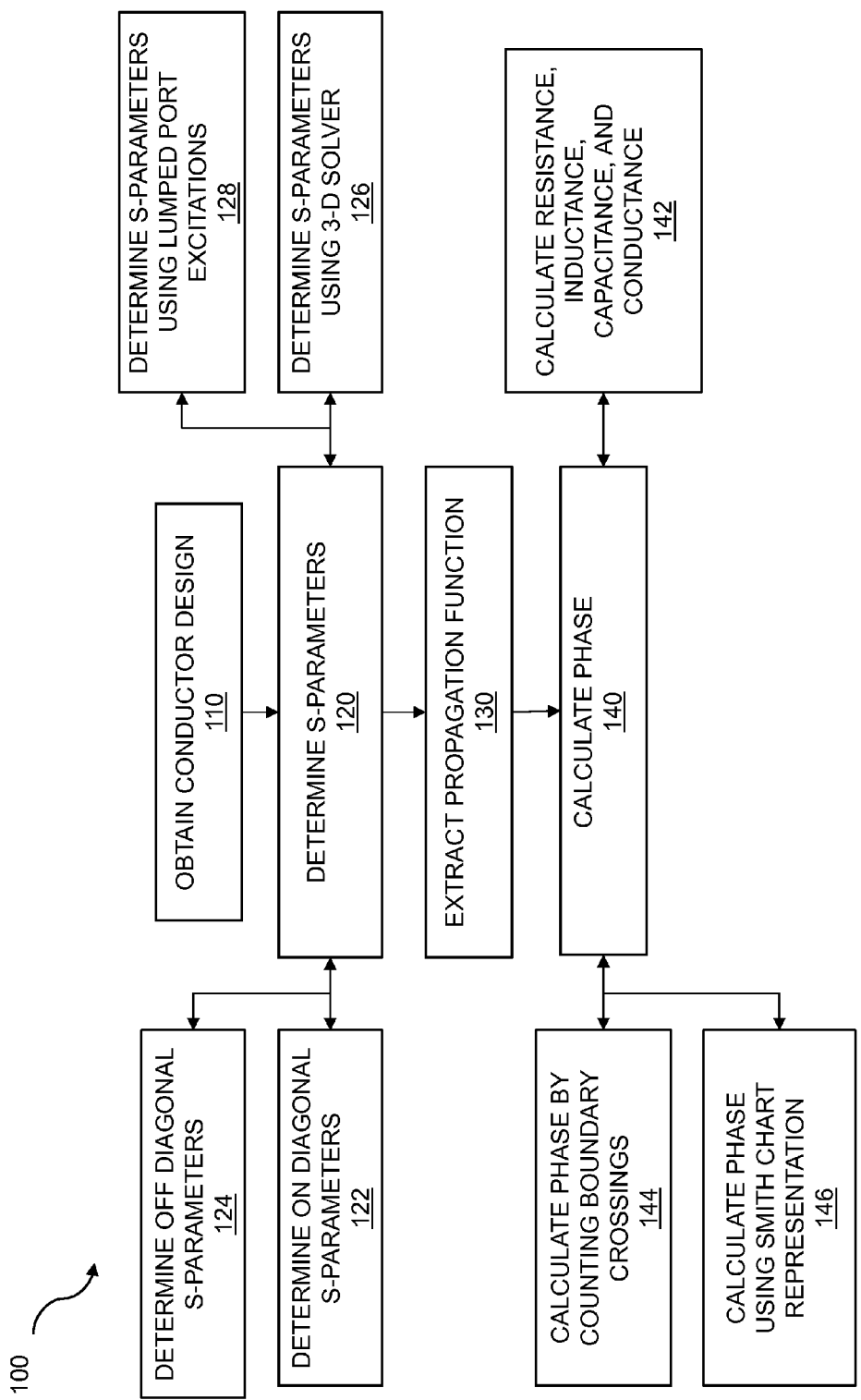
FIG. 1 is a flow diagram for phase determination for extraction.

FIG. 1 is a flow diagram for extraction. The flow 100 describes a computer-implemented method for design analysis. The flow 100 includes obtaining a design with a plurality of conductors 110. The obtaining may include importing a design via design files. The design files may reside in a storage medium in a data format used for the exchange of layout data of integrated circuits (e.g., the information may be stored in a GDSI1 (GDS2), GL1, OASIS, or any other suitable format for storing such design structures). The flow 100 includes determining scattering (S) parameters 120 for the plurality of conductors. The determination of S parameters may be accomplished by various techniques, including, but not limited to, obtaining S parameters from a previous analysis, obtaining S parameters from another tool (including possibly an electronic design automation (EDA) tool), importing S parameters from storage with information on a design, using lumped port excitations 128, using a three-dimensional electromagnetic field solver 126, using time domain vector (TDR) measurements, or using a vector network analyzer (VNA). The flow 100 further comprises extracting a propagation function 130 for the plurality of conductors based on the S parameters. The propagation function can be accurately calculated from the S-parameter matrix by accurately accounting for the phase. The flow 100 includes calculating phase information 140 for the extracting of the propagation function. The phase may be represented using the mathematical expression $2n\pi+\phi$, which indicates the number of boundary crossings 144, and may include zero-crossings on a Smith chart representation 146. In this expression, n may represent the number of times that one of the S parameters crosses a $-2\pi$ or 0 boundary of a Smith chart representation. The value of n may greatly influence the accuracy of RLGC calculations. Without accounting for the value of n, RLGC calculations may become progressively more inaccurate as conductor length increases, frequency range increases, or the number of conductors in the system increases. Disclosed embodiments serve to mitigate these problems by properly considering the phase period.

The flow 100 may further comprise calculating one or more of resistance, inductance, capacitance, or conductance 142 based on the propagation function. The resistance, inductance, capacitance, or conductance may be determined on a per-unit length basis. The phase information may be used in calculating the one or more of resistance, inductance, capacitance, or conductance. The S parameters may be arranged in a matrix, and determining the S parameters may include determining on-diagonal S parameters 122. The determining S parameters may further include determining off-diagonal S parameters 124. The phase information may be calculated for each of the S parameters of interest. The calculating phase information may comprise counting a number of times that one of the S parameters crosses a $-2\pi$ or 0 boundary. The one of the S parameters may be an off-diagonal S parameter. The S parameters may form a 2M-by-2M matrix, where M is a number of conductors for the plurality of conductors and phase for the S parameters continuously decrease as a value for frequency increases. One or more of resistance, inductance, capacitance, or conductance are calculated based on the propagation function. The calculating of phase information may be accomplished without using the two sets of S parameters extracted from two transmission line systems. In some cases, only one set of S parameters may be used for extraction. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
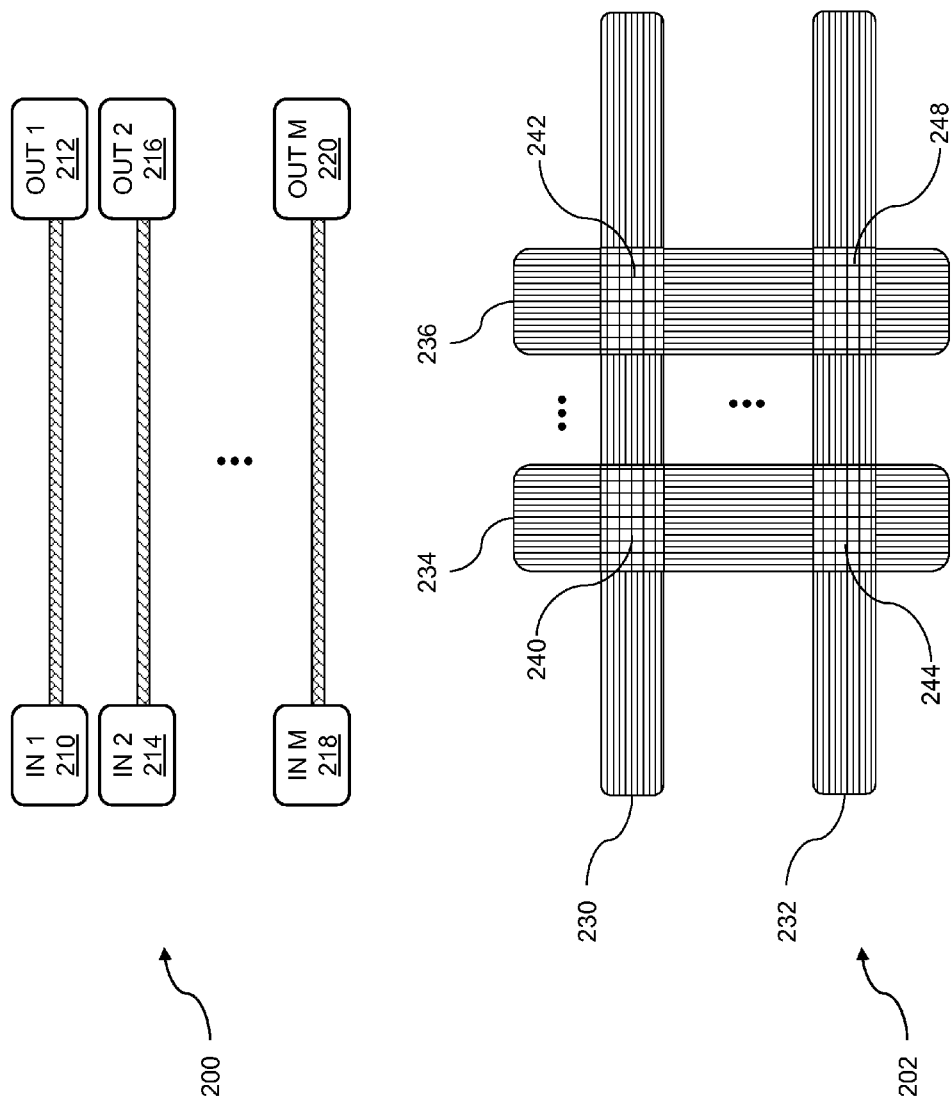
FIG. 2 is an example set of conductors showing coupling.

FIG. 2 is an example set of conductors showing coupling. A plurality of conductors 200 is shown. The plurality of conductors may comprise transmission lines. In general, there are M conductors, each conductor comprising an input (In X) and an output (Out X). The first conductor has input 210 and output 212. The second conductor has input 214 and output 216. The Mth conductor has input 218 and output 220. One of the S parameters may describe a propagation delay for one of the plurality of conductors.

Another plurality of conductors 202 is shown. Conductors 230 and 232 and conductors 234 and 236 overlap, forming overlap regions 240, 242, 244, and 248. In some embodiments, the conductors 234 and 236 may be part of a first metallization layer of an integrated circuit (IC), and the conductors 230 and 232 may be part of a second metallization layer of an integrated circuit (IC). Although the conductors are not in direct physical contact with each other in the overlap regions, they are physically close enough to exert an influence on each other during the passage of non-DC signals. This influence is a mutual influence, in that each transmission line or conductor exerts an influence on other nearby conductors. For example, conductor 234 may influence conductor 232 in overlap region 244, and may influence conductor 230 in overlap region 240. Similarly, conductor 236 may influence conductor 232 in overlap region 248, and may influence conductor 230 in overlap region 242.

Figure 3:
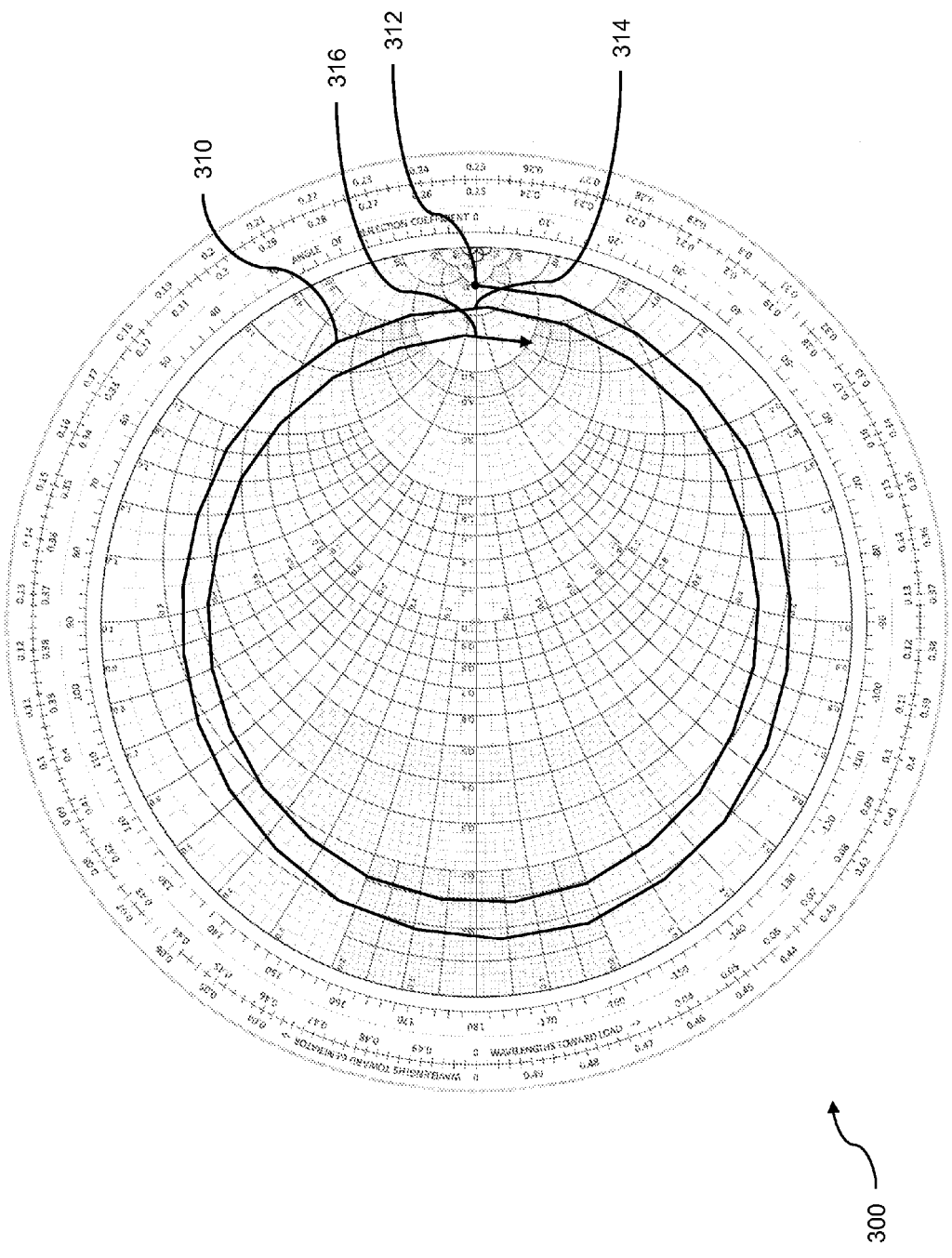
FIG. 3 is a Smith chart with phase tracing.

FIG. 3 is a Smith chart with phase tracing. An S parameter trace is plotted on the Smith chart 300 with a curve 310. The S parameter trace may traverse the Smith chart representation 300 in a clockwise direction. The curve 310 starts at a zero point 312 and proceeds in a clockwise, inward spiral. At a point 314, the curve 310 has a second right-hand zero crossing of the Smith chart 300. At point 316, the curve 310 has a third right-hand zero crossing of the Smith chart 300. Each zero crossing on the right-hand side of the Smith chart represents a phase period. Determining the phase period is an important part of calculating the phase information. The calculating of phase information may be accomplished using a Smith chart representation. In some embodiments, the Smith chart representation may be a graphical rendering of a Smith chart. In other embodiments, the Smith chart representation 300 may be a numerical representation, or another polar plot which conveys the phase period. Note that while in the example illustrated in FIG. 3 the S parameter trace proceeds in a clockwise direction, in some instances, such as in the case of a strongly coupled multiple-line system, local resonances are prevalent, in which case the trace may not traverse the Smith chart in a clockwise direction.

FIG. 4 shows relevant equations 400 for conductors. The S parameters are a function of frequency ($\omega$). The S parameters are used to derive the characteristic impedance $Z_c(\omega)$. $Z_c(\omega)$ represents the ratio of the amplitudes of voltage and current of a single wave propagating along a transmission line, and is determined by the geometry and materials of the transmission line. $W(\omega)$ represents a propagation function. $\gamma(\omega)$ represents a propagation constant. $R(\omega)$ represents the resistance as a function of frequency. $L(\omega)$ represents the inductance as a function of frequency. $G(\omega)$ represents the conductance as a function of frequency. $C(\omega)$ represents the capacitance as a function of frequency. In some embodiments, R, L, G, and C may be computed on a per-unit length basis.

FIG. 5 shows example S parameter matrices. A matrix equation 500 shows a generic form of the S parameter equation where an S parameter matrix 512 is multiplied by an input matrix 514, resulting in output matrix 510. The S parameter matrix 512 has matrix elements along the diagonal, referred to as on-diagonal S parameters. The on-diagonal S parameters ($S_{out,in1}$, $S_{out2,in2}$, etc. . . . ) are representative of the effects of a conductor on itself. The off-diagonal S parameters ($S_{out1,inN}$, $S_{outN,inN}$, etc. . . . ) are representative of the mutual effects of two conductors on each other. One of the S parameters may be an off-diagonal S parameter. The S parameters may form a 2M-by-2M matrix, where M is a number of conductors for the plurality of conductors. Phase for one of the S parameters may continuously decrease as a value for frequency increases. Resistance, inductance, capacitance, or conductance may be calculated based on the propagation function.

Another matrix equation 502 shows a sparse form of the S parameter equation where an S parameter matrix 522 is multiplied by an input matrix 524, resulting in output matrix 520. S parameter matrix 522 has some of its off-diagonal S parameters set to zero. Such setting serves to simplify the matrix calculations, which can save appreciable computation time when dealing with large matrices. For example, when two conductors are sufficiently far apart that their mutual effects are negligible, the off-diagonal S parameters corresponding to the mutual effects may be set to zero to simplify the calculations without compromising the accuracy of the propagation constant.

Figure 6:
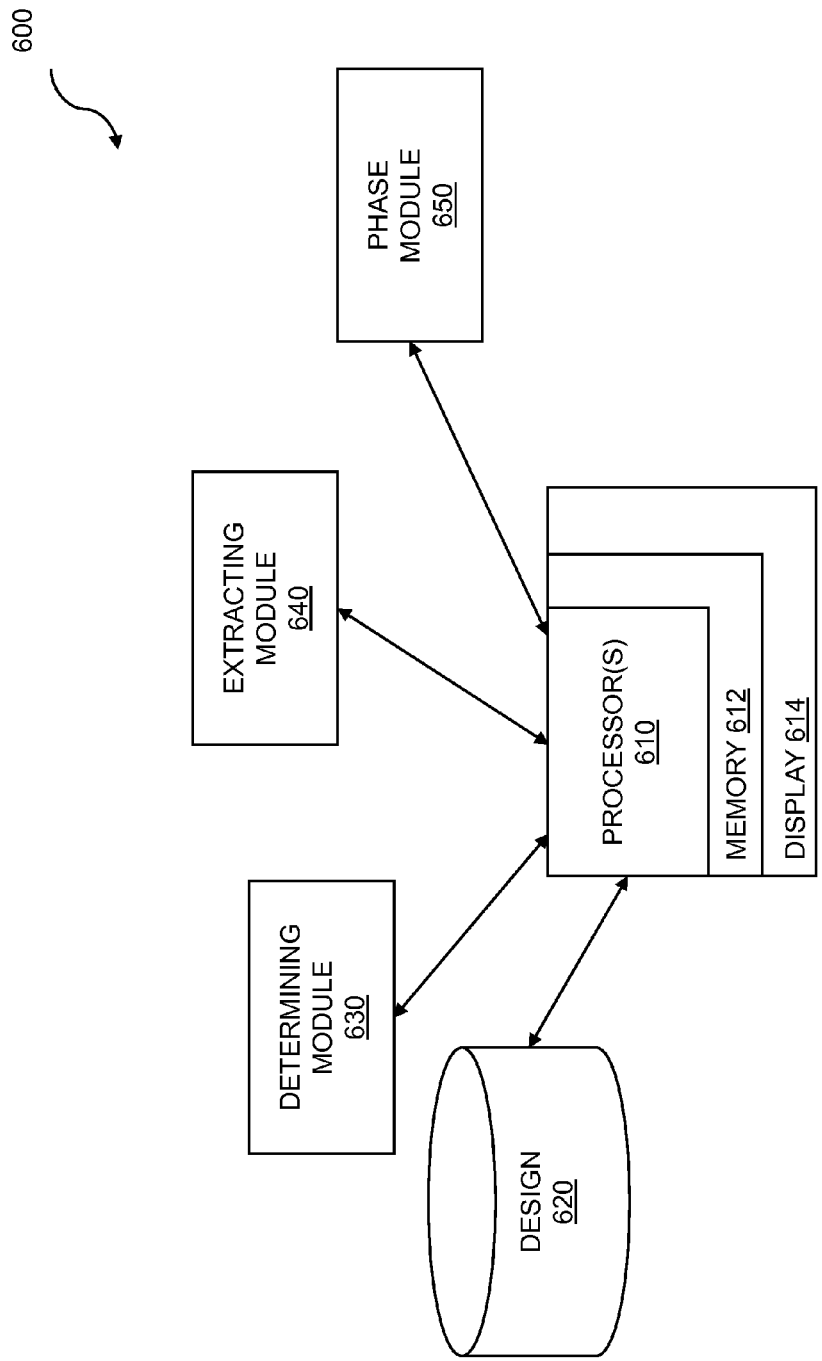
FIG. 6 is a system diagram for phase determination.

FIG. 6 is a system diagram for phase determination. A system 600 includes one or more processors 610 coupled to a memory 612, which can store instructions, and to a display 614. The display 614 may be any electronic display, including but not limited to, a computer display, a laptop screen, a net-book screen, a tablet computer screen, a cell phone display, a mobile device display, a remote with a display, a television, a projector, or the like. The memory 612 may store code, design information, violation report information, debug data, design data, instructions, system support data, intermediate data, analysis results, and the like.

The processors 610 may be configured to access a design 620 including a plurality of conductors as well as a determining module 630, an extracting module 640, and a phase module 640. In at least one embodiment, the one or more processors 610 accomplish the functions of the determining module 630, the extracting module 640, and/or the phase module 650.

The determining module 630 may determine scattering (S) parameters for a plurality of conductors used to describe electrical operation for the semiconductor design. The extracting module 640 may extract a propagation function for the plurality of conductors based on the S parameters to describe signal propagation along the plurality of conductors. The phase module 650 may calculate phase information for the S parameters and may also calculate one or more of resistance, inductance, capacitance, or conductance based on the propagation function.

The system 600 may perform a computer-implemented method for design analysis comprising: obtaining a semiconductor design with a plurality of conductors; determining scattering (S) parameters, for the plurality of conductors, to describe electrical operation for the semiconductor design; extracting a propagation function for the plurality of conductors based on the S parameters to describe signal propagation along the plurality of conductors; calculating phase information for the extracting of the propagation function; and calculating one or more of resistance, inductance, capacitance, or conductance based on the propagation function and the phase information.

The system 600 may further comprise a computer program product embodied in a non-transitory computer readable medium for design analysis. The computer program product embodied in a non-transitory computer readable medium for design analysis may include code for obtaining a design with a plurality of conductors, code for determining scattering (S) parameters for the plurality of conductors, code for extracting a propagation function for the plurality of conductors based on the S parameters, and code for calculating phase information for the extracting of the propagation function.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for design analysis comprising:
   obtaining a design with a plurality of conductors;
   determining scattering (S) parameters for the plurality of conductors;
   extracting, using one or more processors, a propagation function for the plurality of conductors based on the S parameters; and
   calculating phase information for the extracting of the propagation function, wherein the phase information is calculated for each of the S parameters of interest.

2. The method of claim 1 further comprising calculating one or more of resistance, inductance, capacitance, or conductance based on the propagation function.

3. The method of claim 2 wherein the resistance, inductance, capacitance, or conductance are determined on a per unit length basis.

4. The method of claim 2 wherein the phase information is used in the calculating of the one or more of resistance, inductance, capacitance, or conductance.

5. The method of claim 1 wherein the determining S parameters includes determining on-diagonal S parameters.

6. The method of claim 1 wherein the determining S parameters includes determining off-diagonal S parameters.

7. The method of claim 1 wherein one of the S parameters describes a propagation delay for one of the plurality of conductors.

8. The method of claim 1 wherein the plurality of conductors comprise transmission lines.

9. The method of claim 1 wherein the calculating phase information comprises counting a number of times that one S parameter crosses a $-2\pi$ or 0 boundary.

10. The method of claim 9 wherein the one S parameter is an off-diagonal S parameter.

11. The method of claim 9 wherein the calculating phase information is accomplished using a Smith chart representation.

12. The method of claim 11 wherein a trace for the one S parameter traverses the Smith chart representation in a clockwise direction.

13. The method of claim 9 wherein the phase is represented in a form of $2n\pi+\phi$.

14. The method of claim 13 wherein n represents the number of times that the one S parameter crosses a $-2n$ or 0 boundary.

15. The method of claim 14 wherein the S parameters form a 2M-by-2M matrix, where M is a number of conductors for the plurality of conductors; wherein phase for the one of the S parameters continuously decreases as a value for frequency increases; and wherein resistance, inductance, capacitance, or conductance is calculated based on the propagation function.

16. The method of claim 9 wherein the calculating phase information is accomplished without using two sets of S parameters extracted from two transmission line systems.

17. The method of claim 1 wherein the determining the S parameters is accomplished using a three-dimensional electromagnetic field solver.

18. The method of claim 1 wherein the determining the S parameters is accomplished using lumped port excitations.

19. A computer-implemented method for design analysis comprising:
   obtaining a semiconductor design with a plurality of conductors;
   determining scattering (S) parameters, for the plurality of conductors, to describe electrical operation for the semiconductor design;
   extracting, using one or more processors, a propagation function for the plurality of conductors based on the S parameters to describe signal propagation along the plurality of conductors;
   calculating phase information for the extracting of the propagation function; and
   calculating one or more of resistance, inductance, capacitance, or conductance based on the propagation function and the phase information, wherein the phase information is calculated for each of the S parameters of interest.

20. A computer system for design analysis comprising:
   a memory which stores instructions;
   one or more processors coupled to the memory wherein the one or more processors are configured to:
      obtain a design with a plurality of conductors;
      determine scattering (S) parameters for the plurality of conductors;
      extract a propagation function for the plurality of conductors based on the S parameters; and
      calculate phase information for the extracting of the propagation function, wherein the phase information is calculated for each of the S parameters of interest.

21. A computer program product embodied in a non-transitory computer readable medium for design analysis comprising:
   code for obtaining a design with a plurality of conductors;
   code for determining scattering (S) parameters for the plurality of conductors;
   code for extracting a propagation function for the plurality of conductors based on the S parameters; and
   code for calculating phase information for the extracting of the propagation function, wherein the phase information is calculated for each of the S parameters of interest.

22. The computer program product of claim 21 further comprising code for calculating one or more of resistance, inductance, capacitance, or conductance based on the propagation function.

23. The computer program product of claim 21 wherein the calculating phase information comprises counting a number of times that one S parameter crosses a $-2\pi$ or 0 boundary.

24. The computer program product of claim 23 wherein the phase is represented in a form of $2n\pi+\phi$ where n represents the number of times that the one S parameter crosses a $-2\pi$ or 0 boundary.

25. The computer program product of claim 23 wherein the calculating phase information is accomplished without using two sets of S parameters extracted from two transmission line systems.

26. The system of claim 20 wherein the one or more processors are further configured to calculate one or more of resistance, inductance, capacitance, or conductance based on the propagation function.

27. The system of claim 20 wherein calculation of phase information comprises counting a number of times that one S parameter crosses a $-2\pi$ or 0 boundary.

28. The system of claim 27 wherein the phase is represented in a form of $2n\pi+\phi$ where n represents the number of times that the one S parameter crosses a $-2\pi$ or 0 boundary.

29. The system of claim 27 wherein calculation phase information is accomplished without using two sets of S parameters extracted from two transmission line systems.

* * * * *